United States Patent [19]

Bandoh

[11] 4,388,265
[45] Jun. 14, 1983

[54] PROCESS AND APPARATUS FOR MOLDING PLASTICS

[76] Inventor: Kazuo Bandoh, No. 81-8, Toyama, Momoyama-cho, Fushimi-ku, Kyoto-shi, Japan

[21] Appl. No.: 330,699

[22] Filed: Dec. 14, 1981

[51] Int. Cl.³ .................................................. B29G 3/00
[52] U.S. Cl. .............................. 264/297.2; 264/297.8; 264/328.4; 264/328.8; 425/544; 425/588
[58] Field of Search ............... 264/297.2, 297.8, 328.4, 264/328.8; 425/544, 588

[56] References Cited

U.S. PATENT DOCUMENTS

| | | | |
|---|---|---|---|
| 2,130,254 | 9/1938 | Visman | 264/328.5 X |
| 3,483,287 | 12/1969 | Davis | 264/328.5 X |
| 3,763,300 | 10/1973 | Spanjer | 264/297 X |
| 3,764,248 | 10/1973 | Hall | 425/544 |

FOREIGN PATENT DOCUMENTS 38-24716 11/1963 Japan ..................................... 425/544

Primary Examiner—Thomas P. Pavelko
Attorney, Agent, or Firm—Larson and Taylor

[57] ABSTRACT

In molding a number of articles of plastics at the same time with use of an upper mold and a lower mold having a multiplicity of cavities in the fitting surfaces thereof, a process for molding plastics by supplying the molding material to a plurality of pots each provided for one pair of cavities in proximity thereto, and injecting the material into the cavities from the pots through gates without passing the material through any runner. An apparatus for practicing the process is also disclosed. The waste of the molding material can be reduced at least by the amount conventionally needed for filling the main and auxiliary runners.

5 Claims, 7 Drawing Figures

PROCESS AND APPARATUS FOR MOLDING PLASTICS

BACKGROUND OF THE INVENTION

Conventional apparatus for molding plastics comprise an upper mold and a lower mold which include opposed blocks each having pairs of opposed cavities in each of the fitting surfaces of the molds. An auxiliary runner is formed between the opposed cavities and communicates with the cavities through gates. The center block of the apparatus has in its center a cull portion from which main runners branch out to communicate with the auxiliary runners.

When semiconductor chips are to be enclosed with plastics by the molding apparatus, lead frames carrying semiconductor chips are set in place between the fitting surfaces of the upper and lower molds, and the molds are thereafter clamped together. A preheated molding material, such as epoxy resin or like thermosetting synthetic resin, is fed to a pot in the center of the upper mold and plasticized in the pot by being subjected to pressure with a plunger. The plasticized material is injected into the cavities through the main runners, auxiliary runners and gates and is molded with the semiconductor chips enclosed with portions of the material.

When the resin material is thus molded with the apparatus described above, portions of the material are also molded in the cull portion, main runners, auxiliary runners and gates, so that the operation affords a seriously reduced yield of about 65% if highest, or as low as 20% or lower in extreme cases. Since the molding material is thermosetting and is therefore not resuable, the waste of the material results in a great economical loss.

SUMMARY OF THE INVENTION

The present invention relates to a process and an apparatus for molding plastics, and more particularly to a process and an apparatus for molding a plurality of plastics articles under pressure at the same time with use of molds having a multiplicity of pairs of opposed cavities and pots each provided for each pair of cavities in proximity thereto, by supplying a molding material to the pots and advancing plungers provided for the pots to inject the material into the cavities without passing the material through runners.

An object of the present invention is to mold plastics economically and efficiently with use of an apparatus having pots each positioned close to each pair of opposed cavities and communicating therewith through gates, and plungers each provided for each of the pots.

Another object of the invention is to provide a process and an apparatus for molding plastics by injecting a molding material from a pot into a pair of cavities through a cull portion and gates so that the waste of the molding material can be reduced at least by the amount otherwise needed for filling the main runner and auxiliary runner.

Another object of the invention is to provide a molding apparatus which is formed with cavities with a portion thereof corresponding to the conventional center block portion which is usually provided with a single pot of increased capacity and main runner, the apparatus thus being adapted to have an increased number of cavities to assure a greatly increased yield.

Still another object of the invention is to provide a process for molding plastics with use of an apparatus in which each pair of cavities is arranged symmetrically with respect to a pot in communication with the pot so that a number of molded articles can be formed at the same time in a uniform shape within a shortened period of time.

DESCRIPTION OF THE PREFERRED EMBODIMENT

Figure 1:
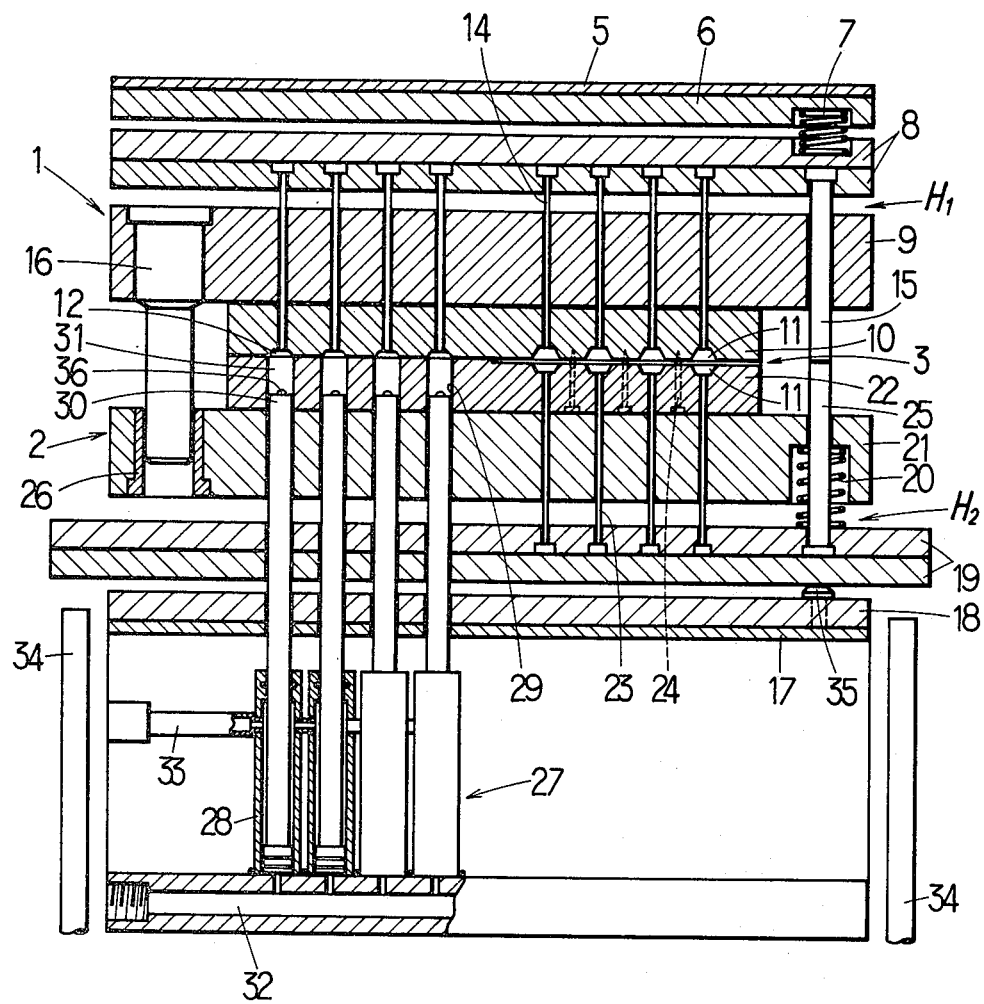
FIG. 1 is a view in vertical section schematically showing a molding apparatus of the invention with its molds clamped.

FIGS. 1 to 5 show an apparatus embodying the invention for enclosing semiconductors with plastics by molding.

The molding apparatus consists chiefly of a stationary upper mold 1 and a movable lower mold 2. Lead frames 4 having semiconductor chips attached thereto are placed between the fitting surfaces 3 of the molds to enclose the chips with a material, e.g. thermosetting synthetic resin by molding.

The upper mold 1 and the lower mold 2 will be described in detail with reference to FIGS. 1, 4 and 5.

The upper mold 1 has an upper mold attaching plate 6 fixed to the under side of a heat insulating plate 5. An upper ejector plate 8 which is movable into or out of contact with the plate 6 is disposed under the plate 6 with a compression spring 7 interposed therebetween. An upper mold support plate 9 is disposed under the upper ejector plate 8 as spaced therefrom by a specified distance Hl. An upper mold main body 10 is fixed to the lower side of the support plate 9.

Figure 2:
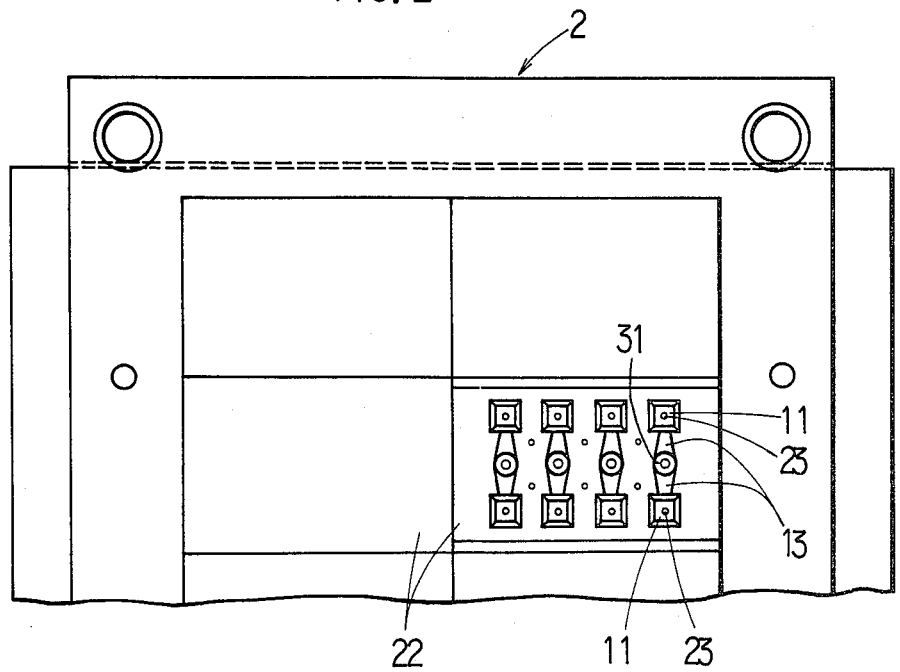
FIG. 2 is a plan view showing part of the upper surface of the lower mold.
Figure 3:
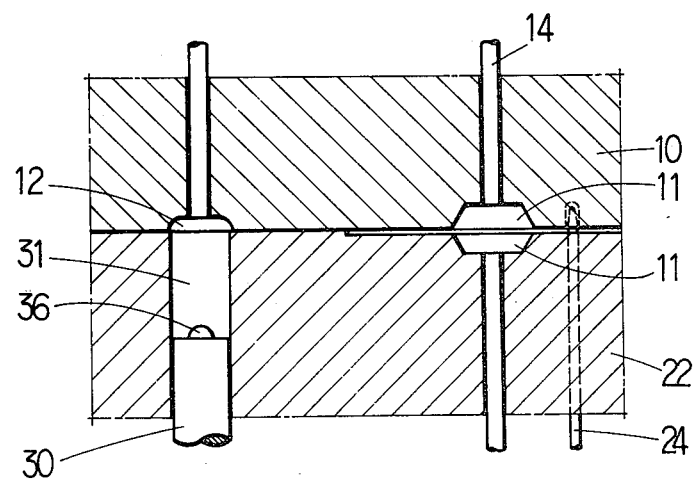
FIG. 3 is a fragmentary enlarged view in vertical section showing the upper and lower molds as fitted together.

The upper mold main body 10 includes a plurality of blocks each formed in its lower surface with pairs of opposed cavity portions 11 arranged symmetrically with respect to the center line of the block. In the present embodiment, each of the blocks has four pairs of cavity portions 11 as seen in FIG. 2.

The upper mold main body 10 has cull portions 12 equal in number to the number of the pairs of cavity portions 11. Each cull portion 12 communicates with one pair of cavity portions 11 through a pair of gates 13.

Extending through the support plate 9 and the main body 10 are a required number of upper ejector pins 14 each fixed at its base end to the ejector plate 8. A group of ejector pins 14 have free ends which are movable into or out of the cavity portions 11. The other ejector pins 14 have free ends which are movable into or out of the cull portions 12.

An upper return pin 15 fixed at its base end to the ejector plate 8 extends through the support plate 9, and the extension of the pin 15 is positioned outside the mold main body 10 and terminates substantially at the same level as the lower surface of the mold main body 10. Disposed outside the main body 10 on the other side thereof opposite to the return pin 15 is a positioning guide pin 16 fixed at its base end to the upper mold support plate 9 and extending downward beyond the level of the mold main body 10.

The movable lower mold 2 chiefly comprises a heat insulating plate 17, a lower mold attaching plate 18 having a stopper 35 thereon, and a lower ejector plate 19 positioned above the plate 18 with the stopper 35 provided therebetween.

A lower mold support plate 21 is disposed above the lower ejector plate 19 as spaced therefrom by a distance H2. A lower mold main body 22 is fixedly mounted on the support plate 21. A compression spring 20 is interposed between the lower ejector plate 19 and the lower mold support plate 21. The upper side of the lower mold main body 22 serves substantially as a mold surface which is movable into or out of contact with the mold surface of the upper mold main body 10.

As seen in FIG. 2, the mold surface of the lower mold main body 22 is formed with four pairs of cavity portions 11 in each of its blocks. These cavity portions 11 coact with the cavity portions 11 of the upper mold main body 10 to form desired molded articles when the molds are clamped. Accordingly the cavity portions 11 of the lower mold are arranged and shaped in symmetrical relation to those of the upper mold.

In opposed relation to the aforementioned cull portions 12 formed in the upper mold main body 10, a plurality of pots 31 are formed in the lower mold main body 22. Each of the pots 31 communicates with one pair of cavity portions 11 through gates 13 resembling the gates 13 in the upper mold 1.

Lower ejector pins 23, corresponding to the abovementioned group of upper ejector pins 14, are fixed to the lower ejector plate 19 and are movable into or out of the cavity portions 11 in the lower mold main body 22. To enclose semiconductor chips with thermosetting synthetic resin by the upper mold 1 and lower mold 2, the lead frames 4 of the chips are placed in position on the mold surface of the lower mold main body 22. For this purpose, positioning pins 24 are attached to the lower mold main body 22. The free ends of the pins 24 substantially project upward from the mold surface of the main body 22.

In corresponding relation to the upper return pin 15, a lower return pin 25 is fixed to the lower ejector plate 19. When the upper and lower molds are clamped, the pin 25 bears against the upper return pin 15.

The lower mold support plate 21 is provided with a guide bush 26 for the guide pin 16. The bush and the pin coact to position the cavity portions 11 of the upper and lower molds 1, 2 in register accurately when the molds are clamped.

The lower mold 2 is further provided with means 27 for injecting the molding material. The injecting means 27 comprises double acting cylinder assemblies each including a cylinder tube 28 disposed vertically below the lower heat insulating plate 17 and a piston-like plunger 30 slidably intimately fitted in the tube 28.

With the present embodiment, each plunger 30 is inserted in a bore 29 extending through the heat insulating plate 17, lower mold attaching plate 18, lower ejector plate 19, lower mold support plate 21 and lower mold main body 22. Such bores 29 are opposed to the cull portions 12 of the upper mold 1. A pressure fluid, such as hydraulic oil, is fed to the cylinder assemblies of the injecting means 27 through a fluid channel 32 to raise the plungers 30 at the same time, or through a fluid channel 33 to lower the plungers 30 at the same time. When the plungers 30 are lowered to the position shown in FIG. 1, with the upper ends of the plungers retracted from the mold surface of the lower mold main body 22, the upper end portions of the bores 29 serve as the pots 31.

When the plungers 30 are raised with a molding material supplied to the pots 31 individually, the material can be fed to the cavities each comprising a pair of upper and lower cavity portions 11 through the cull portions 12 and gates. Thus the molding material is fed to the cavities from the pots without being passed through runners. This assures a higher yield.

To achieve a further improved yield, it is preferable that the forward end of each plunger 30 be provided with the semispherical projection 36 which is fittable in the cull portion 12 of the upper mold. The movable lower mold 2 is provided with ejector bars 34 for moving the ejector plate 19.

The molding apparatus having the foregoing construction operates in the following manner for enclosing semiconductors with thermosetting synthetic resin.

Figure 4:
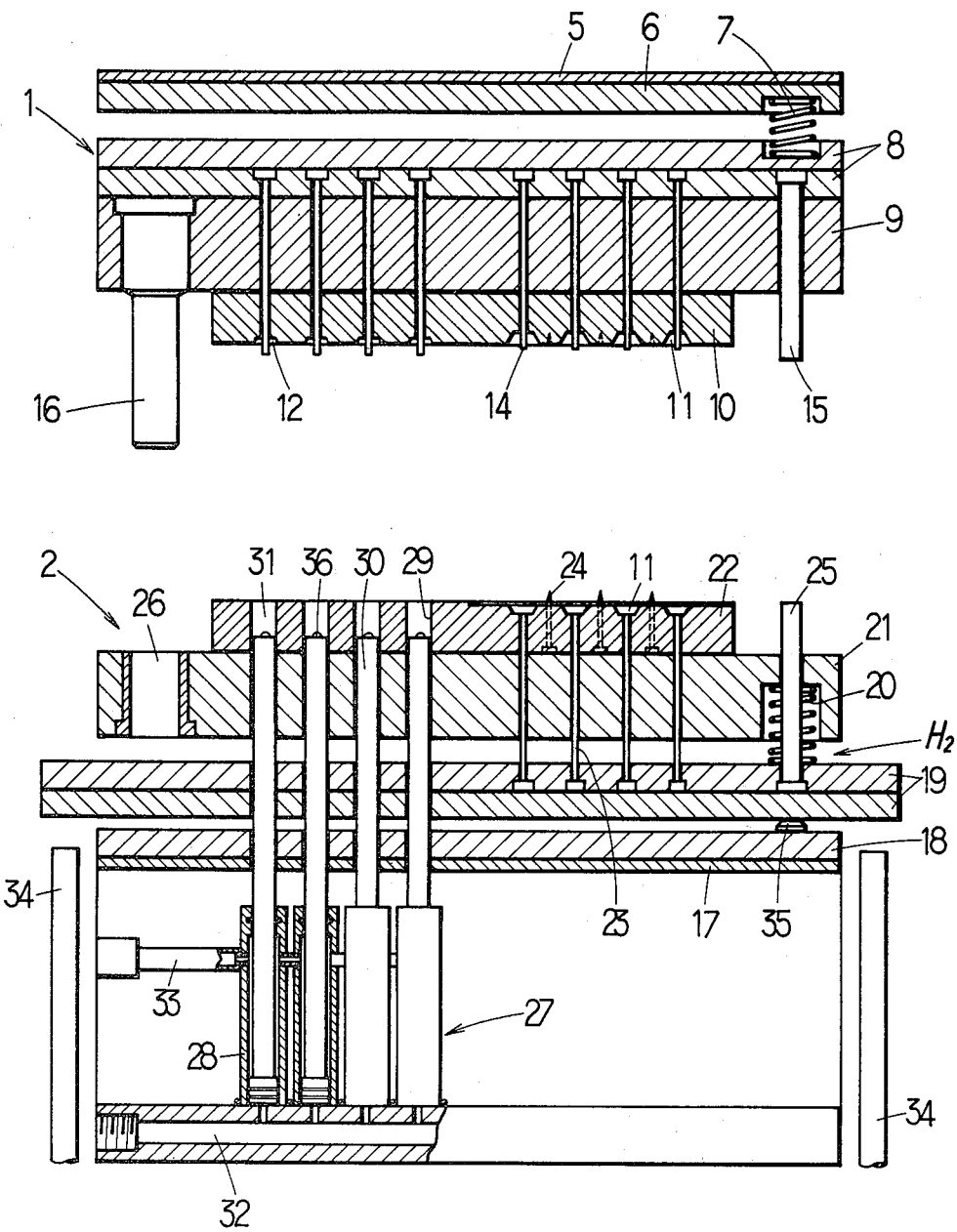
FIG. 4 is a view in vertical section schematically showing the molding apparatus with its molds opened.
Figure 5:
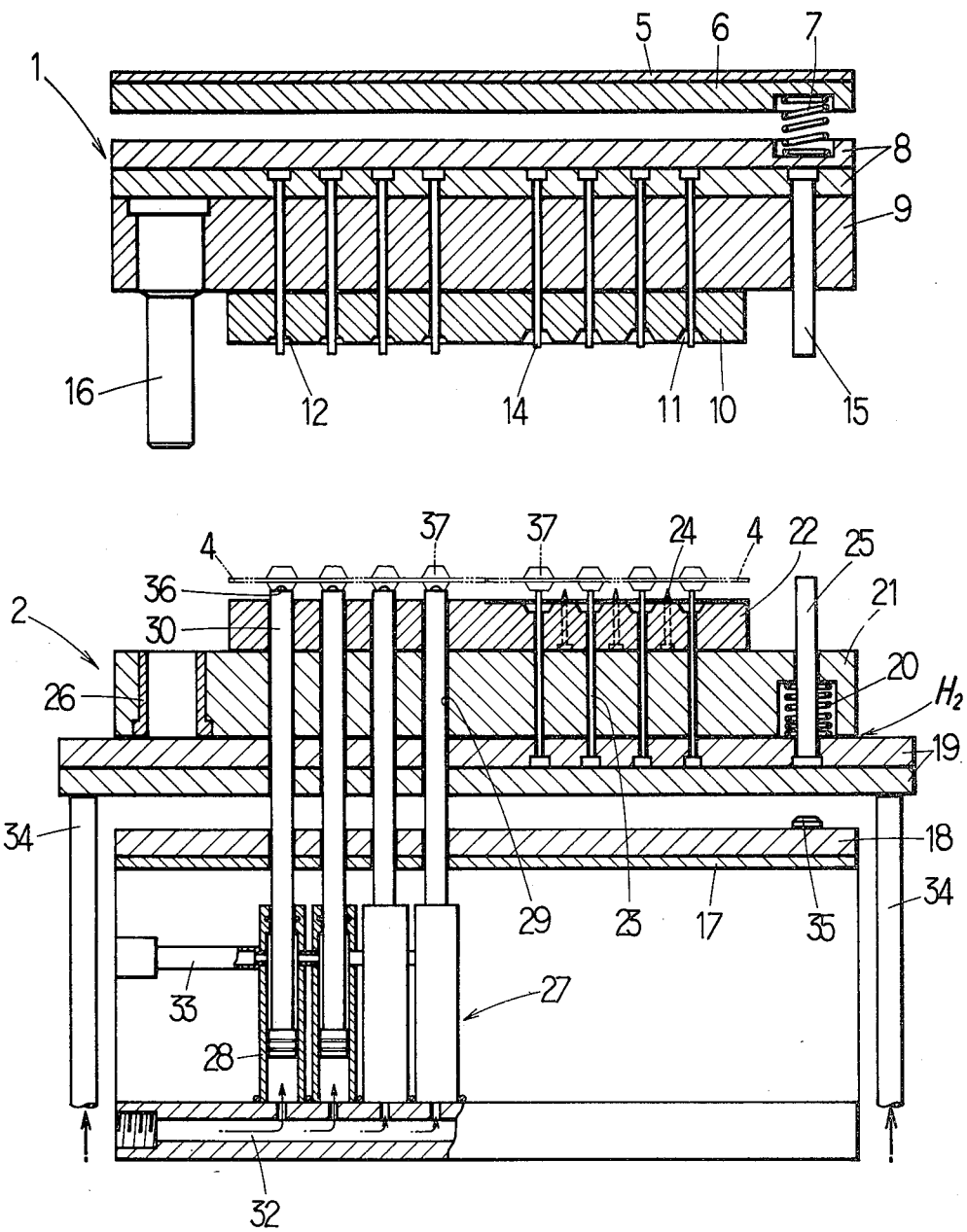
FIG. 5 is a view in vertical section schematically showing the molding apparatus with molded articles ejected from the lower mold.

With the molds opened to the state of FIG. 4, a lead frame 4 having semiconductor chips is placed on each cavity block of the lower mold main body 22. A preheated thermosetting synthetic resin, such as epoxy resin, is supplied to the pots 31. The positioning pins 24 serve to postion the semiconductor chips on the lead frame 4 in the cavity portions 11 of the mold main body 22.

With the lead frames 4 accurately positioned between the fitting surfaces 3 of the upper and lower molds 1 and 2, the molds are clamped to the state of FIG. 1.

A working fluid, such as pressure oil, is then supplied to the cylinder tubes 28 of the injecting means 27 through the channel 32 to raise the plungers 30, whereby the material is pressurized in the pots and plasticized in the cull portions 12. The plasticized material is immediately injected into the cavities from the cull portions 12 through the gates 13 to enclose the semiconductor chips by molding.

When the molds are opened after a curing time, the molded portions in the cavity portions 11 in the upper mold are released therefrom by the ejector pins 14 which are forced outward within the range of the clearance Hl by the action of the compression spring 7. At the same time, the lower ejector pins 23 are forced up along with the lower ejector plate 19 by the ejector bars 34. Consequently the enclosed molded pieces 37 are released from the cavities along with the lead frames 4, whereby the desired molded articles are obtained.

On completion of the above operation, the ejector bars 34 descend to lower the lower ejector plate 19 and the ejector pins 23 to the original position. The plungers 30 are lowered by the pressure oil supplied through the channel 33, whereby a cycle of molding operation is completed. The apparatus is ready for the next cycle.

Figure 6:
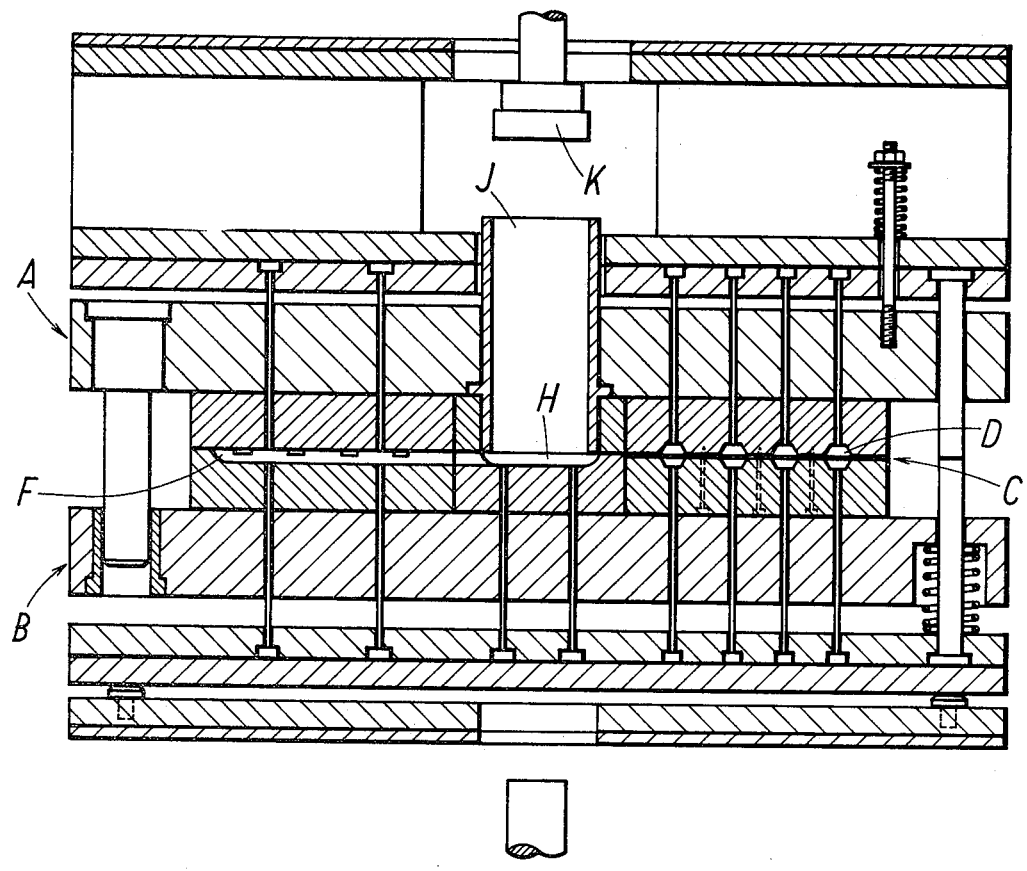
FIG. 6 is a view in vertical section schematically showing a conventional molding apparatus with its molds clamped.
Figure 7:
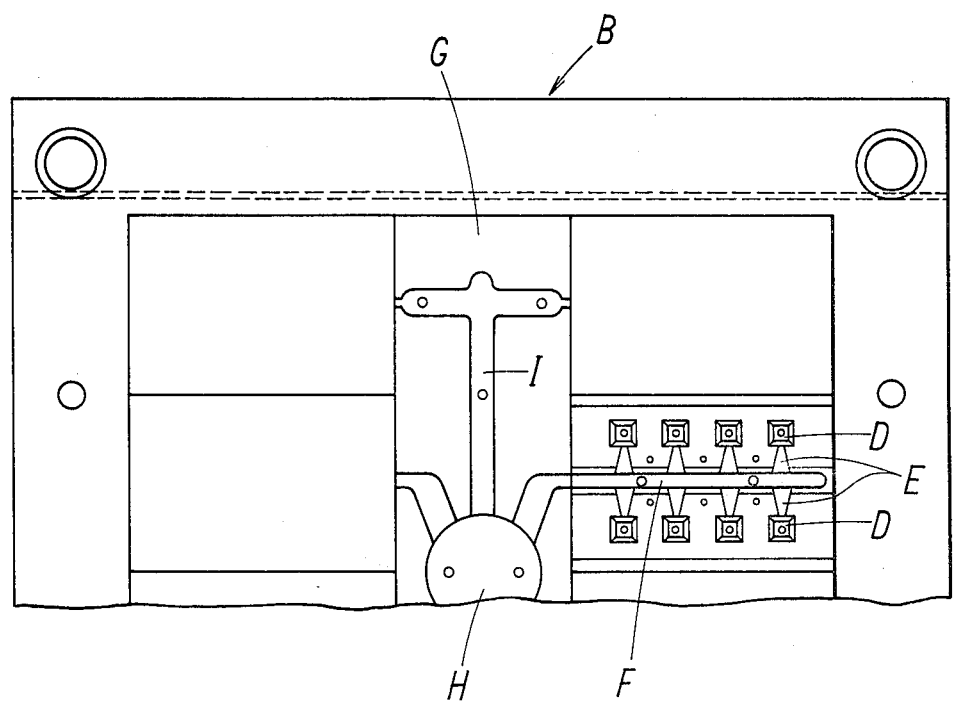
FIG. 7 is a plan view showing part of the upper surface of the lower mold of the apparatus of FIG. 6.

The main feature and advantages of the molding operation conducted by the above apparatus will become more apparent from the following description of the conventional apparatus shown in FIGS. 6 and 7.

These drawings show an upper mold A and a lower mold B which can be opened and clamped and include opposed blocks each having pairs of opposed cavity portions D in each of the fitting surfaces C of the molds.

As seen in FIG. 7, an auxiliary runner F is formed between the opposed cavity portions D and communicates with the cavity portions D through gates E. The center block G of the lower mold shown has in its center a cull portion H from which main runners I branch out to communicate with the auxiliary runners F.

In opposed relation to the cull portion H, the upper mold A has a single large pot J. The molding material filled in the pot J is pressurized and plasticized by a plunger K.

With the conventional molding apparatus described, the material plasticized in the pot J is injected into the cavity portions D for molding by way of the main runners I, auxiliary runners F and gates E, with the result that the material is molded partly in the main runners I and auxiliary runners F. This entails a corresponding reduction in the yield.

In the case of the process and apparatus of this invention, the molding material is directly injected into the cavities from the cull portions only via the gates, so that the yield can be improved by an amount at least corresponding to the spaces of the main runners and auxiliary runners, while the molded articles can be released with greater ease since the apparatus includes no main runner or auxiliary runner that would produce a molding.

According to the invention in which no material is molded in the main runner or auxiliary runner, a great economical advantage can be achieved when the material is thermosetting synthetic resin which is not reusable.

Further according to the invention, cavities can be formed also in the center block portion which is conventionally provided with a single pot of increased capacity and main runners, with the resulting advantage that the apparatus has a correspondingly increased number of cavities.

The present invention is not limited to the enclosing of semiconductors described with reference to the embodiment but is useful generally for the molding of plastics within the scope of the invention.

What is claimed is:

1. In a process of molding a number of articles of plastics at the same time with use of molds having a multiplicity of cavities, the improvement which comprises supplying the plastics molding material to a plurality of pots individually, the pots being arranged in proximity to the cavities, and injecting the molding material into the cavities from the pots through gates without passing the material through runners.

2. In molding apparatus for forming plastics molded articles including an upper mold and a lower mold which can be clamped and opened and having a multiplicity of cavities in the fitting surfaces thereof, and means for injecting a plastics molding material from a pot into the cavities, the improvement which comprises a plurality of pots formed in the fitting surface of one of the upper and lower molds and positioned in proximity to the cavities, molding material injecting means provided on the same mold as the pots in corresponding relation to the pots individually, cull portions formed in the fitting surface of the other mold and opposed to the pots individually, and gates for holding each of the pots in communication with the corresponding cavities without any runner provided between the pot and the cavities.

3. A molding apparatus as defined in claim 2 wherein the lower mold is provided with the pots and the injecting means.

4. A molding apparatus as defined in claim 2 or 3 wherein each of the injecting means comprises a cylinder assembly provided for the pot and includes a vertically movable plunger, the plunger being inserted in a bore formed in the mold and having at the mold fitting surface an end space serving at the pot.

5. A molding apparatus as defined in claim 4 wherein the plunger of the cylinder assembly is provided at its foward end with a projection fittable into the curl portion.

* * * * *